US010126918B2

United States Patent
Sharma et al.

(10) Patent No.: US 10,126,918 B2
(45) Date of Patent: Nov. 13, 2018

(54) CUSTOMIZED GUIDED WORKFLOW ELEMENT ARRANGEMENT

(71) Applicant: Adobe Systems Incorporated, San Jose, CA (US)

(72) Inventors: Vikas Sharma, Lucknow (IN); Nishant Kumar, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 413 days.

(21) Appl. No.: 14/926,241

(22) Filed: Oct. 29, 2015

(65) Prior Publication Data

US 2017/0123631 A1  May 4, 2017

(51) Int. Cl.
*G06F 3/00* (2006.01)
*G06F 3/0482* (2013.01)
*G06F 3/01* (2006.01)

(52) U.S. Cl.
CPC .................................. *G06F 3/0482* (2013.01)

(58) Field of Classification Search
CPC .... G06F 3/0482; G06F 9/4446; G06F 3/0481; G06F 3/04895
See application file for complete search history.

(56) References Cited

U.S. PATENT DOCUMENTS

| | | | | |
|---|---|---|---|---|
| 7,707,505 B1* | 4/2010 | Ohrt | ................. | G06F 17/30893 715/738 |
| 2003/0095150 A1* | 5/2003 | Trevino | ............... | G01R 33/546 715/810 |
| 2003/0098890 A1* | 5/2003 | Makinen | ............... | G06F 3/0481 715/810 |
| 2012/0159341 A1* | 6/2012 | Murillo | ................. | G06Q 10/06 715/739 |
| 2015/0248484 A1* | 9/2015 | Yu | ..................... | G06F 17/30867 707/711 |

* cited by examiner

*Primary Examiner* — Nicholas Augustine
(74) *Attorney, Agent, or Firm* — Wolfe-SBMC

(57) ABSTRACT

Customized guided workflow element arrangement techniques are described in which user interface elements configured to provide entry points for guided workflows are dynamically arranged based upon usage frequency of application features. In one or more implementations, personalized views of a workflow selection screen are generated and provided to users by arranging UI elements on an individual basis. Workflows related to features of an application that are used are identified based on per-user tracking. Ranks are set for the workflows based at least upon relative usage of corresponding features as determined through the tracking, which establishes an order for different workflows one to another. A user interface that implements the workflow selection screen may then be exposed having UI elements that are configured as entry points to different guided workflows and arranged in a customized arrangement in accordance with the rankings.

20 Claims, 8 Drawing Sheets

CUSTOMIZED GUIDED WORKFLOW ELEMENT ARRANGEMENT

BACKGROUND

Consumer image editing and content creation is on the rise due at least in part to wide availability of computing devices, mobile phones, tablets, and other portable devices that include cameras and support image editing software. A variety of different editing and creation operations may be performed using different software applications. In connection with such operations, a user may make use of different tools and step-by-step processes to create, modify, and enhance portions of content, add different effects, and otherwise interact with images and content. It may be difficult for new and unsophisticated users to learn all the features available via an application or application suite, and/or to remember the steps for complex workflows. Additionally, manual workflow processes can be quite time consuming and difficult to use on some computing platforms, such as mobile phones.

SUMMARY

Customized guided workflow element arrangement techniques are described in which user interface elements configured to provide entry points for guided workflows are dynamically arranged based upon usage frequency of application features. The guided workflows are designed to provide step-by-step instructions to walk users through complicated, multiple step operations associated with creation and editing of digital content via applications. In one or more implementations, personalized views of a workflow selection screen are generated and provided to users by arranging UI elements on an individual basis. To do so, tracking of user interaction with features available via an application is performed. Then, workflows related to features of the application that are actually used are identified based on the tracking. Ranks are set for the workflows based at least upon relative usage of corresponding features as determined through the tracking. The ranks establish an order for different workflows one to another. A user interface that implements the workflow selection screen may then be exposed having UI elements that are configured as entry points to different guided workflows and arranged in accordance with the rankings. In this manner, the arrangement of elements is automatically customized based on the relative usage of features.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
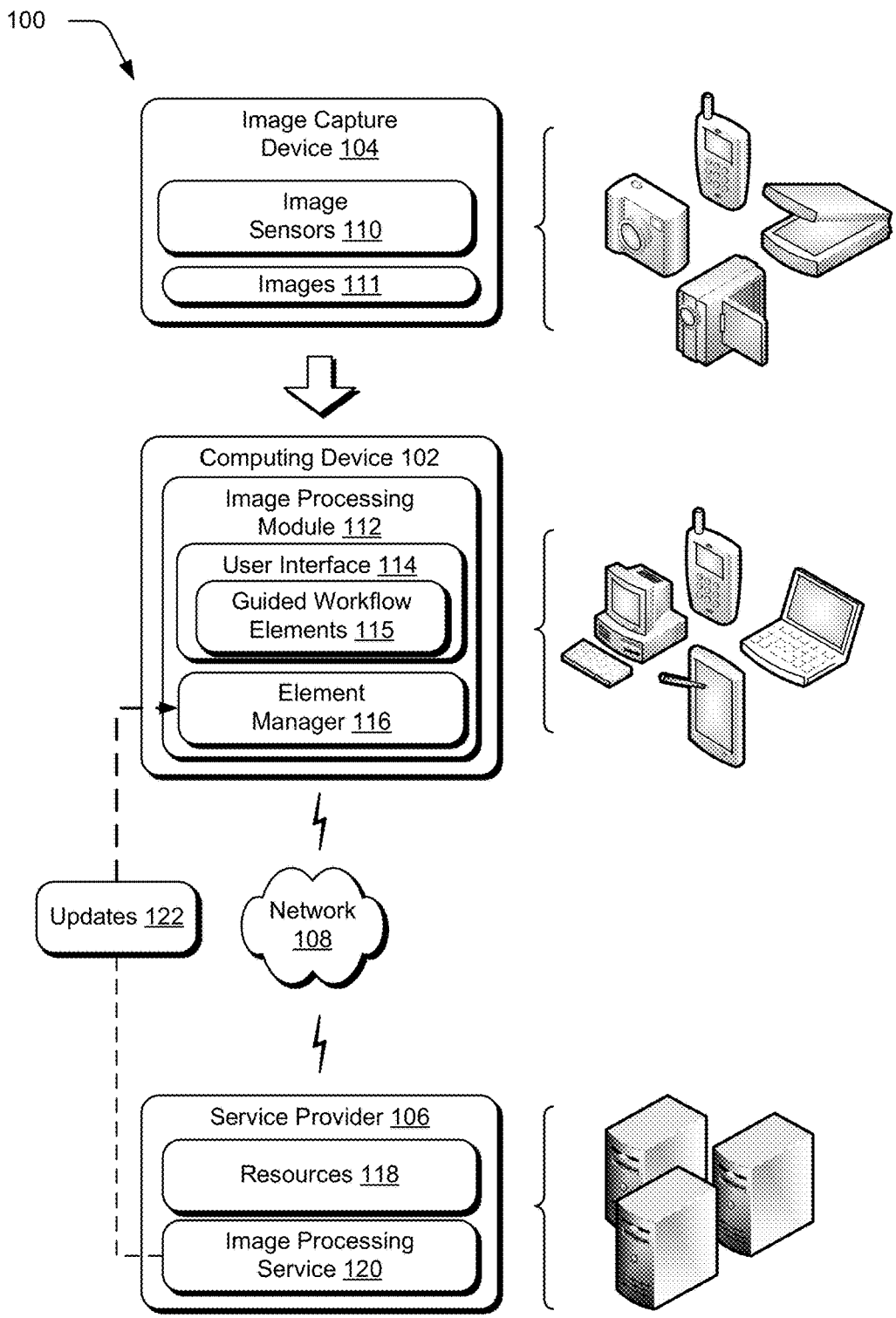
FIG. 1 is an illustration of an environment in an example implementation that is operable to employ techniques described herein.

Generally, it may be difficult for new and unsophisticated users to learn all the features available via an application or application suite and/or to remember the steps for complex workflows. Additionally, manual workflow processes can be quite time consuming and difficult to use on some computing platforms, such as mobile phones. Although some applications may include guided workflows designed to provide step-by-step instructions to walk users through complicated operations, traditional guided workflows may be difficult to discover and are not tailored to the behavior of individual users. For example, applications may bury workflow entry points within a menu hierarchy that forces a user to navigate the menu to find a desired workflow. Additionally, the menu items are traditionally static and do not update based on items that a user actually interacts with.

Customized guided workflow element arrangement techniques are described in which user interface elements configured to provide entry points for guided workflows are dynamically arranged based upon usage frequency of application features. The described techniques may be employed in connection with various image editing operations and tools typically provided by image editing applications, examples of which include Adobe Photoshop™ and Adobe Photoshop Elements™. Although aspects are described herein in relation to image editing, the described techniques may also be employed in connection with other types of applications and scenarios for content creation and editing operations that provide guided workflows to assist user.

In one or more implementations, personalized views of a workflow selection screen are generated and provided to users by arranging UI elements on an individual basis. To do so, tracking of user interaction with features available via an application is performed. Then, workflows related to features of the application that are actually used are identified based on the tracking. For example, a table or other data structure that maps features to different workflows for an application may be maintained and referenced to correlate tracking data indicative of user activity with corresponding application features and workflows.

Ranks or priorities are set and adjusted over time for the workflows based at least upon relative usage of corresponding features as determined through the tracking. For example, default ranks set for available workflows may be updated based upon tracking data that indicates features and operations that particular users have interacted with and the frequency of use of those features and operations. Tracking data is collected on a per-user basis and may be associated with a user account to enable user-specific customizations of the workflow selection screen and roaming of the customizations across different devices.

The ranks set based on the tracking data establish an order for different workflows one to another such that workflows including frequently used features and operations attain higher ranks and priorities over time relative to infrequently used items. Various UI elements associated with guided workflows (e.g., icons, tabs, interactive cards, tiles, and/or other UI instrumentalities that may be configured as workflow entry points) are customized and arranged according to the workflow ranking. For example, a user interface that implements the workflow selection screen may be exposed having various UI elements that are configured as entry points to different guided workflows and arranged in accordance with the rankings. By way of example and not limitation, customizations may include arrangements of different tabs corresponding to different feature categories provided within a tabbed user interface as well as arrangement of elements (e.g., cards, tiles, icons) corresponding to different individual application features exposed via the different tabs. In this manner, the arrangement of elements is automatically customized based on the relative usage of features.

Customized guided workflow element arrangement techniques as described herein enhance image and content editing operations by making selection of guided workflows faster and more convenient for users. The workflow selection views and elements are customized for individual users automatically without the user having to take any additional actions. The system operates on behalf of users to determine workflows that the users are most likely to be interested in based on past behavior, and then configures the UI to expose entry points for higher ranking workflows in more prominent positions within the UI. Accordingly, users can easily discover and utilize relevant guided workflows through the customized selection UI.

In the following discussion, an example environment is first described that may employ the techniques described herein. Example details and procedures are then described which may be performed in the example environment as well as in other environments. Consequently, example details and procedures are not limited to the example environment and the example environment is not limited to example details and procedures described herein.

Example Environment

FIG. 1 is an illustration of an environment 100 in an example implementation that is operable to employ techniques described herein. In this example, the environment 100 represents an image editing environment. More generally, techniques described herein may also be employed in connection with environments corresponding to various types of applications and scenarios for content creation and editing that make use of guided workflows to make operations easier for users. The image editing environment is depicted as but one illustrative example of the many types of applications and scenarios that are suitable for customized guided workflow element arrangement techniques described in this document.

Customized guided workflow element arrangement techniques involve customizing UI elements that correspond to entry points for workflows. In the context of the described techniques, workflows are designed to provide step-by-step instructions to walk users through complicated, multiple step operations associated with creation and editing of digital content via applications. For example, when launched, a workflow may provide various textual descriptions and visual clues regarding the steps involved in completion of a corresponding task. Workflows may be presented via a pop-up window, side-bar, and annotations within a user interface for a content editing applications. Elements that correspond to entry points for workflows may be presented on one or more pages of the user interface in arrangements that are customized using the techniques discussed above and below.

Different pages of a user interface may be implemented via a tabbed interface that includes a tab bar with multiple available tabs for the different pages. The tabs may each correspond to a different category of application features, such as groups of related operations, a settings view, a project view, and so forth. Generally, the tabbed interface and tabs make it easy for a user to switch between different views or pages of the user interface to access different types of content and application features. In this context, elements for guided workflow may be arranged and customized across different tabs that correspond to different categories of workflows. Further, customizations of the workflows may include customized arrangements of the different tabs corresponding to different feature categories one to another as well as the customized arrangements of the elements (e.g., cards, tiles, icons) that are contained on the different tabs.

The example environment 100 includes a computing device 102 and an image capture device 104, which may be configured in a variety of ways. Additionally, the computing device 102 may be communicatively coupled to one or more service providers 106 over a network 108. Generally speaking, a service provider 106 is configured to make various resources (e.g., content, services, web applications, etc.) available over the network 108, such as the Internet, to provide a "cloud-based" computing environment and web-based functionality to clients.

The computing device 102 may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and processing resources (e.g., mobile devices). Additionally, although a single computing device 102 is shown, the computing device 102 may be representative of a plurality of different devices to perform operations. Additional details and examples regarding various configurations of computing devices, systems, and components suitable to implement aspects of the techniques described herein are discussed in relation to FIG. 7 below.

The image capture device 104 represented in FIG. 1 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device 102, e.g., for a tablet configuration, a laptop, a mobile phone or other implementation of a computing device having a built in image capture device 102. The image capture device 104 is illustrated as including image sensors 110 that are configured to form images 111. In general, the image capture device 102 may capture and provide images 111, via the image sensors 110 that may be stored on and further processed by the computing device 102 in various ways. Naturally, images 111 may be obtained in other ways also such as by downloading images from a website, accessing images from some form of computer readable media, and so forth.

The images 111 may be obtained by an image processing module 112. Although the image processing module 112 is illustrated as being implemented on a separate device it should be readily apparent that other implementations are also contemplated in which the image sensors 110 and image processing module 112 are implemented on the same device. Further, although illustrated as being provided by a computing device 102 in a desktop configuration, a variety of other configurations are also contemplated, such as remotely over a network 108 as a service provided by a service provider, a web application, or other network accessible functionality.

Regardless of where implemented, the image processing module 112 is representative of functionality operable to manage images 111 in various ways. Functionality provided by the image processing module 112 to manage images may include but is not limited to functionality to organize, access, browse and view images, as well as to perform various kinds of image processing operations upon selected images. Examples of the image processing module 112 include but are not limited to Adobe Photoshop™ and Adobe Photoshop Elements™. Comparable content creation and editing applications for content other than images are also contemplated, such as for web content creation, document editing, illustrations, video editing, and so forth.

The image processing module 112 is represented as having a corresponding user interface 114, through which various application functionality and features are exposed to users. In accordance with techniques described herein, the user interface 114 is configured to include various guided workflow elements 115 to support provision of guided workflows to assist users in discovering and using functionality and features of the application. As noted, guided workflow are designed to give step-by-step instructions and hints to walk users through complicated operations. For instance, if a user wants to apply a certain image filter or correction to an image, the user selects an appropriate guided workflow element 115 to launch a corresponding guided workflow and is then presented with the step-by-step instructions to complete the selected operation. In this context, the guided workflow elements 115 may be configured as various user interface instrumentalities that provide entry points for guided workflows and facilitate user navigation to discover and select the various available guided workflows. Guided workflow elements 115 may include but are not limited to icons, tabs of a tabbed interface, interactive cards, tiles, selectable controls, graphic elements, and menu items to name a few examples.

In accordance with techniques described herein, the image processing module 112 further includes or makes use of an element manager 116. The element manager 116 represents functionality operable to customize arrangements of guided workflow elements 115 within the user interface 114 based on tracking data collected on a per-user basis. To do so, the element manager 116 may be configured to implement functionality to classify workflows according to features and commands associated with the workflows. As a user interacts with an application, the element manager 116 recognizes different features and commands that get executed. The element manager 116 may accordingly maintain a table, mapping file, database or other suitable data structure that links the features and commands to the workflows in which they occur. The element manager 116 additionally is configured to collect and track usage data for the features/commands on a per-user basis.

Element manager 116 operates to set ranks (e.g., priorities) for different guided workflows based on usage tracking and adjusts the ranks over time as more and more usage data for individual users is obtained. The ranks determined based on the tracking data establish an order for different workflows one to another and are used as a basis to customize arrangements of guided workflow elements 115. For example, the workflow rankings are applied under the influence of the element manager 116 to cause rearrangement of the user interface 114 to organize elements according to the workflow rankings. Over time, guided workflows having the most frequently used features/commands are ranked higher and consequently displayed in the most prominent locations.

As further shown in FIG. 1, the service provider 106 may be configured to make various resources 118 available over the network 108 to clients. In some scenarios, users may sign up for accounts that are employed to access corresponding resources from a provider. The provider may authenticate credentials of a user (e.g., username and password) before granting access to an account and corresponding resources 118. Other resources 118 may be made freely available, (e.g., without authentication or account-based access). The resources 118 can include any suitable combination of services and content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

For example, the service provider 106 in FIG. 1 is depicted as including an image processing service 120. The image processing service 120 represents network accessible functionality that may be made accessible to clients remotely over a network 108 to implement aspects of the techniques described herein. For example, functionality to manage and process images described herein in relation to image processing module 112 and element manager 116 may alternatively be implemented via the image processing service 120, or in combination with the image processing service 120. Thus, the image processing service 120 may be configured to provide cloud-based access to image editing tools and guided workflows, as well as other tools and functionality described above and below.

Additionally, the image processing service 120 may produce updates 122 to rankings, workflows, and elements that are delivered for use by the element manager 116. Updates 122 can include new workflows that can be associated with preset ranks to control where the new workflows are displayed within a UI. The new workflows can be promoted by setting sufficiently high default ranks to cause elements for the new workflows to be displayed prominently. Updates 122 can also include ranking lists targeted to particular user behavior, characteristics, and/or geo-locations. For example, different default workflow rankings for users in North America and users in China may be generated and distributed based on location. Various updates and group-based rankings may be generated based on usage tracking for a user community as a whole. The different ranking lists may be based on differences in workflow usage recognized for different groups of users. Details regarding these and other aspects of customized guided workflow element arrangement techniques are discussed in relation the following example user interfaces and procedures.

Customized Guided Workflow Element Arrangement Details

Figure 2:
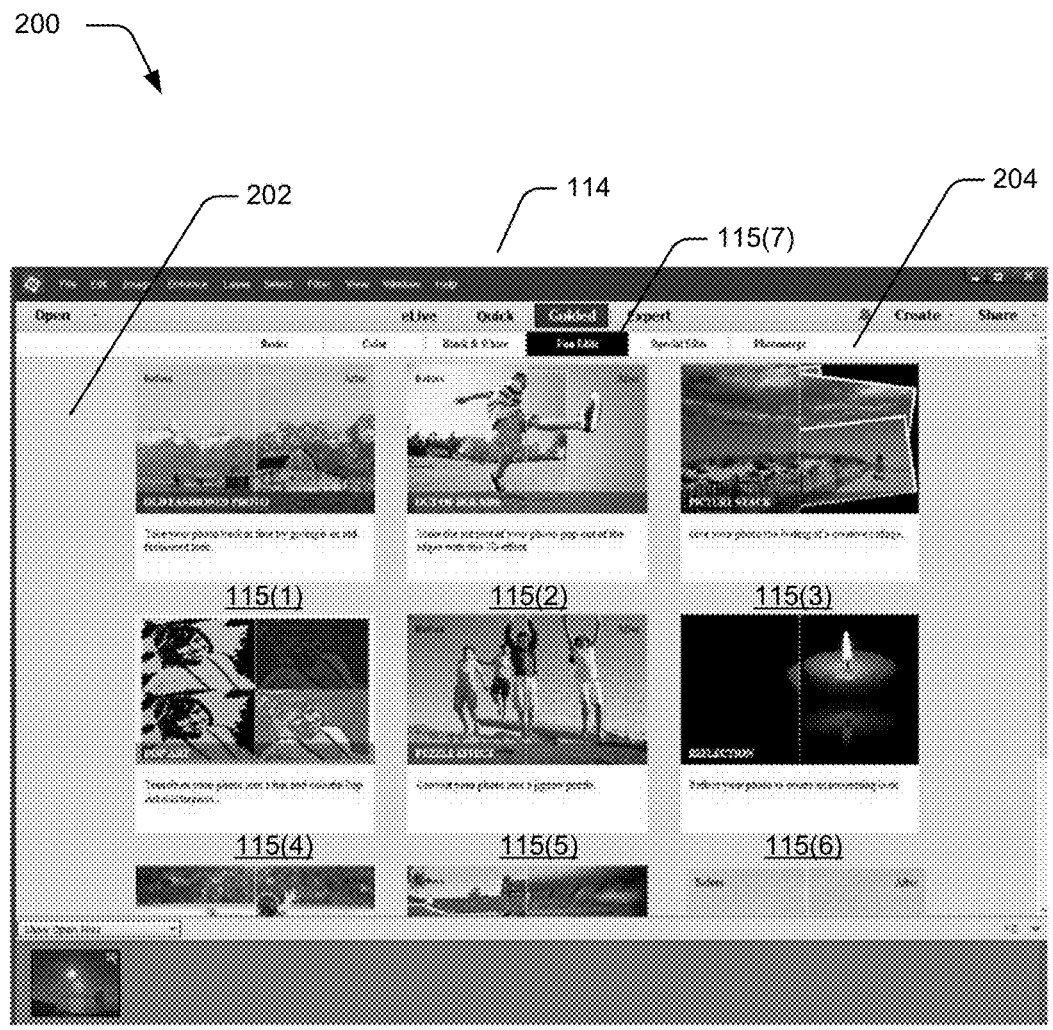
FIG. 2 depicts an example user interface that implements a guided workflow selection screen in accordance with one or more implementations.

FIG. 2 depicts generally at 200 an example user interface 114 that implements a guided workflow selection screen in accordance with one or more implementations. In this example, the user interface 114 includes an example workflow selection screen 202 that includes a collection of guided workflow elements 115 each of which is configured as an entry point for a corresponding guided workflow. As noted, the guided workflow are designed to give step-by-step instructions regarding features of an application. The user interface is also represented as a tabbed interface having a tab bar 204 with multiple available tabs. The tabs may each correspond to a different category of application features, such as groups of related operations, a settings view, a project view, and so forth. Generally, the tabbed interface and tabs make it easy for a user to switch between different views or pages of the user interface to access different types of content and application features.

In this example, the user interface 114 corresponds to an image processing module and accordingly the guided workflow elements 115 represent different image editing operations such as old fashioned photo, out of bounds, picture stack, etc. Likewise, the tabs represent different categories of image editing operations such as basic, color, black & white, and so forth. Represented guided workflow elements 115 labeled 115(1) to 115 (6) are represented as being arranged on a selected tab 115(7) in an initial or default order according to pre-set rankings. Guided workflow elements 115(1) to 115 (6) are shown as a collection of selectable card components that represent different available features using graphics, descriptions and examples. The selectable card components are selectable to launch corresponding guided workflows. In addition to the cards, guided workflow elements 115 in the example user interface also include the various tabs of the tab bar 204 on which different categories of cards may be arranged.

The default view(s) of the guided workflow selection screen/UI can be modified using the techniques described above and below to customize the arrangement of the cards included on the individual tabs, and also reorder the tabs if appropriate, based on rankings assigned to different guided workflow elements 115. In particular, ranking values assigned to workflows are adjusted based on tracking of feature usage to favor workflows having features that are used the most frequently. In this context, default and current rankings may be updated on a per-user basis each time users interact with an application. This causes ranks for individual workflows to change over time and consequently the arrangement of guided workflow elements 115 in the user interface 114 to be reordered in accordance with the ranks.

Figure 3:
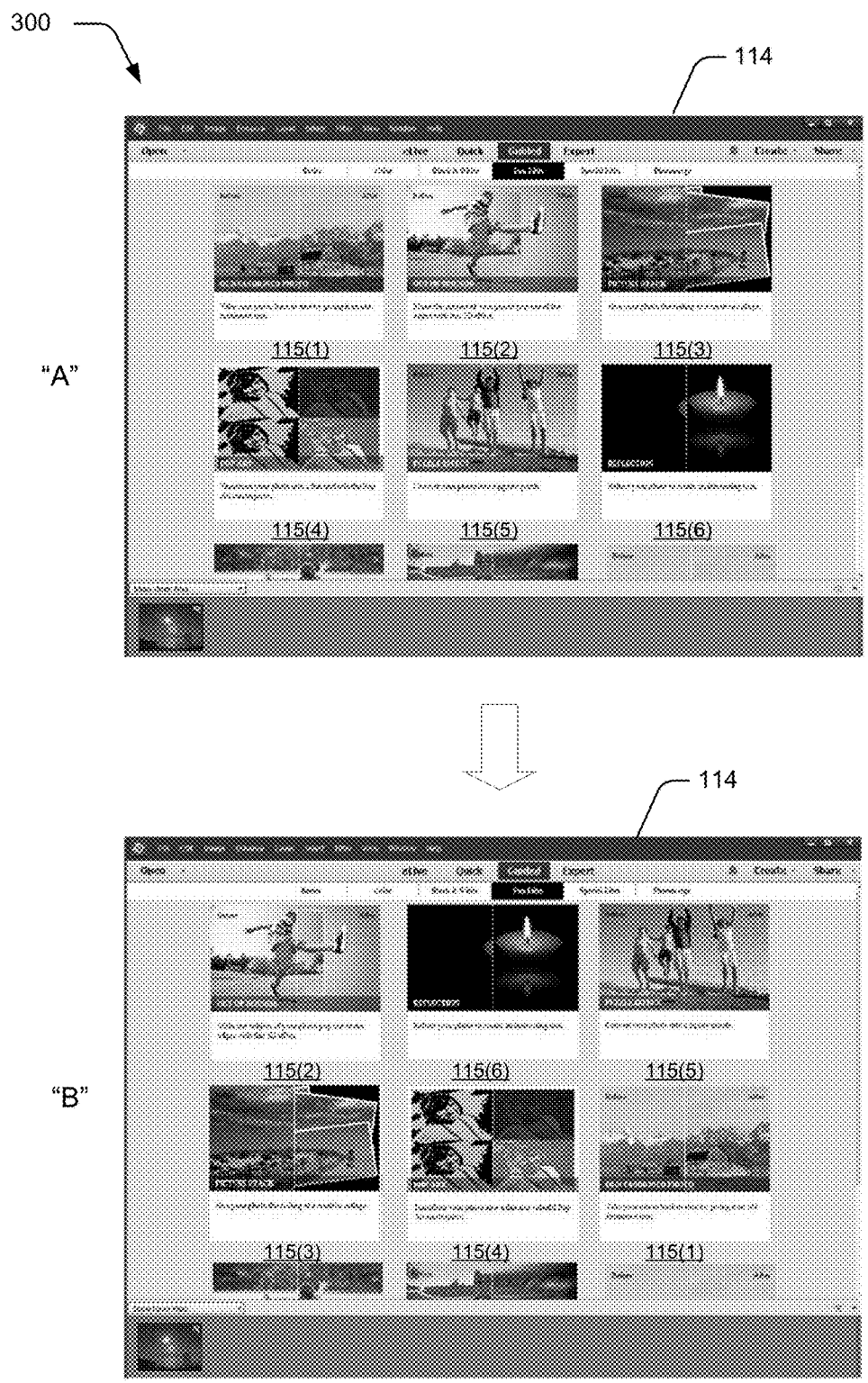
FIG. 3 illustrates an example scenario in which elements in a user interface are arranged based on feature usage in accordance with one or more implementations.

To illustrate, consider FIG. 3 which depicts generally at 300 an example scenario in which elements in a user interface are arranged based on feature usage in accordance with one or more implementations. In particular, FIG. 3 shows views "A" and "B" of the example user interface 114 of FIG. 2. View "A" corresponds to an existing arrangement of a workflow selection screen according to pre-set or current rankings and prior adjustments due to usage tracking. View "B" corresponds to a rearrangement of the elements in view "A" following application of rankings that are updated as a result of on-going feature usage tracking. Comparison of the guided workflow elements 115 depicted in view "A" with those in view "B" reveals that elements have been rearranged. For example, element 115(2) is moved from a second position in view "A" to a first position in view "B" as a result of tracking. Here, at least one feature involved in the workflow for element 115(2) would have been identified as part of the tracking and consequently caused an increase in the rank associated with the workflow for element 115(2).

Other elements are also rearranged in view "B" based on the current rankings. In this example elements are ordered from left to right and top to bottom according to ranks assigned to the underlying workflows. Here, the upper left corner is considered the most prominent location and consequently the highest ranking guided workflow element is exposed at this location. Ranks of elements/workflows generally decrease moving across from left to right, and down from top to bottom. Naturally, different arrangements and definitions regarding which positions of a UI are more prominent may be employed depending upon the type of application, the user interface layout, and the usage scenario.

Figure 4:
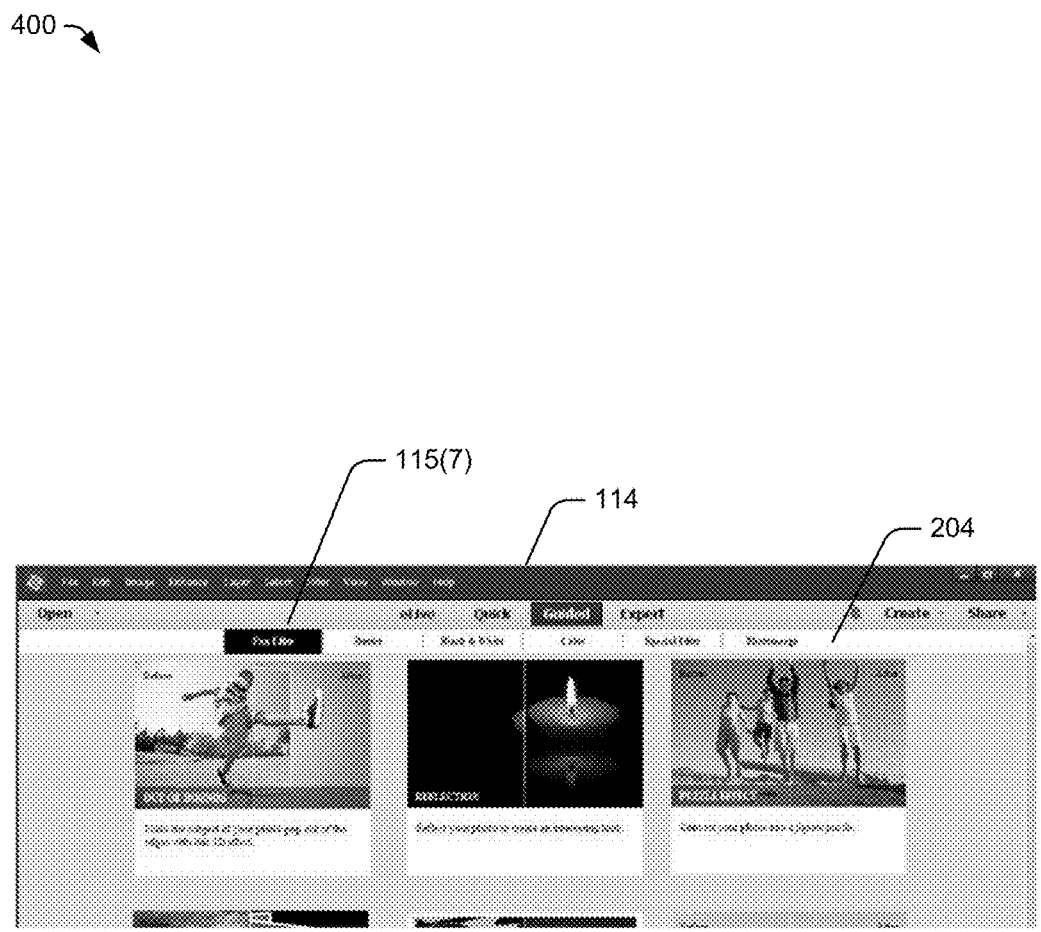
FIG. 4 illustrates an example scenario in which tabs of a user interface are arranged based on feature usage in accordance with one or more implementations.

Moreover, comparable techniques may be employed to rearrange other types of guided workflow elements such as icons, tabs, ordered lists, menu items, and the like. For example, FIG. 4 illustrates generally at 400 an example scenario in which tabs of a user interface are arranged based on feature usage in accordance with one or more implementations. Notably, the selected tab 115(7) introduced in relation to the example of FIG. 2 is represented as being rearranged to a position as a first tab in the tab bar 204. This rearrangement of tabs occurs based on tracking that indicates the workflows contained on the tab 115(7) are used most frequently relative to workflows accessible via other tabs. FIG. 4 represents that both the cards located on tabs and the tabs may be rearranged. More generally, various guided workflow elements contained in a user interface and used to provide selection of and access to guided workflows may be rearranged based on workflow classification and ranking techniques as described in this document.

Example Procedures

The following discussion describes techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. The procedures may be performed by a suitably configured computing device, such as the example computing device 102 that include or makes use of an element manager 116 to manage arrangement of guided workflow elements 115 for a user interface 114. In portions of the following discussion, reference may be made to the examples of FIGS. 1-4.

Figure 5:
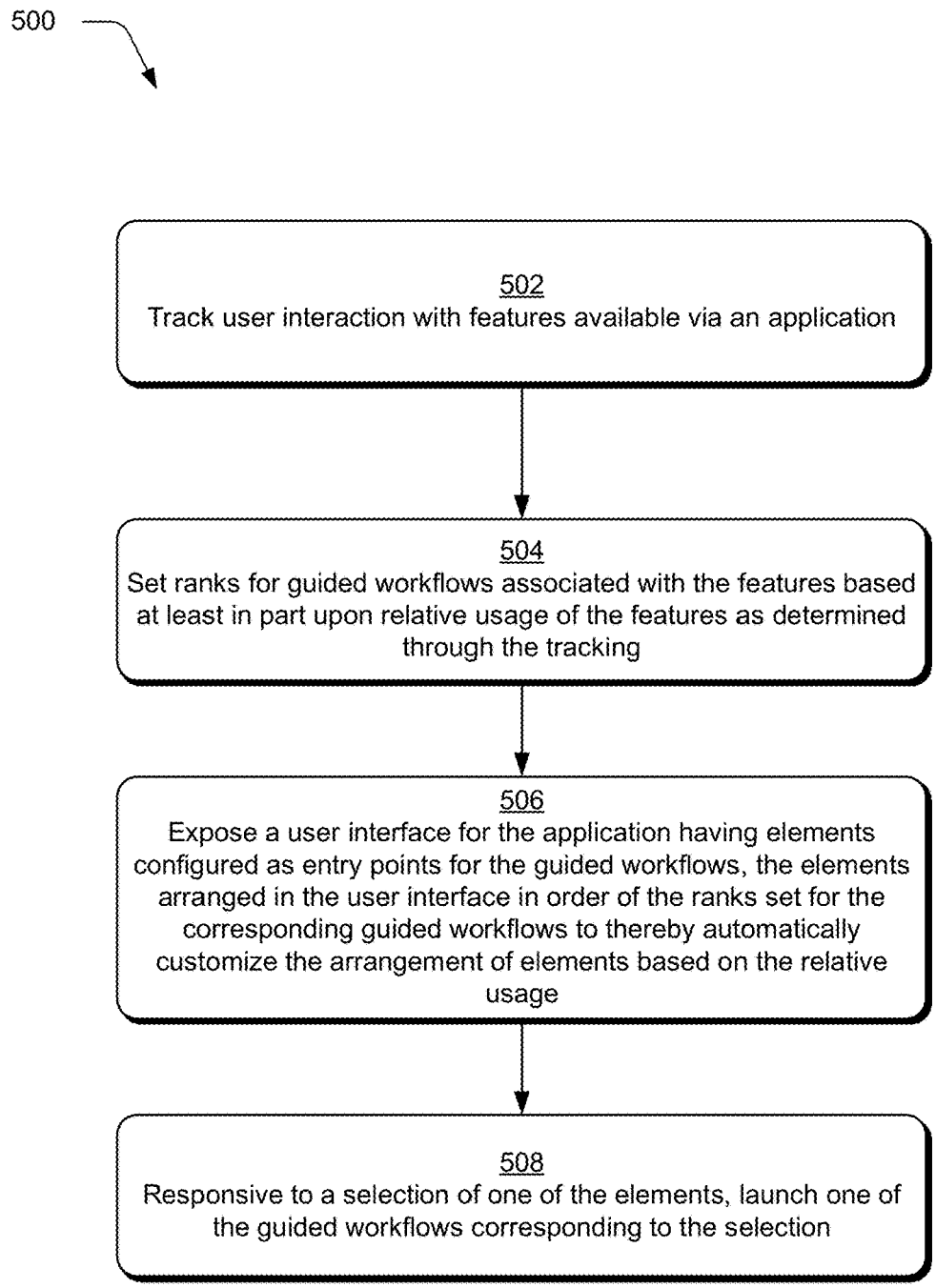
FIG. 5 is a flow diagram depicting an example procedure in accordance with one or more implementations of customized guided workflow element arrangement.

FIG. 5 is a flow diagram depicting an example procedure 500 in accordance with one or more implementations of customized guided workflow element arrangement. User interaction is tracked with features available via an application (block 502). The tracking may occur in connection with an image processing module 112 for interaction with images or another application for creation and editing of corresponding content. The tracking may involve monitoring usage of application features used to interact with, create, and edit content on a per-user basis. As noted, a feature map may be generated and maintained to link features to workflows that utilize the features. Additionally, the tracking includes collecting data on a per-user basis indicative of the features used by individual users and the frequency of use. The per-user tracking data and individualized feature maps may be stored as user data in association with user accounts. By so doing, user-specific data regarding features and workflows may be roamed across different devices to enable customizations described herein to move with the user to different locations, platforms, and devices.

Ranks for guided workflows associated with the features are set based at least in part upon relative usage of the features as determined through the tracking (block 504). Initially, workflows may be assigned default ranks by the application developer to define the default view for a guided workflow selection UI. Then, as user interaction with the application occurs, data regarding feature usage is obtained and used to update the rankings.

In one approach, default values for workflows are incremented by a defined weight factor (e.g., k) each time a feature (or corresponding application command) included in the workflow is recognized as having been used by a user. Thus, the more times a particular feature is used, the more the ranking for corresponding workflows increases. It should be mentioned that the system is effective at finding and organizing related workflows together as long as those workflows share common features. For example, if a user really likes and uses a particular kind of image editing tool often, not only does that particular image editing tool become more prominently displayed, but similar workflows also attain higher ranks due to having common features and are also surfaced in prominent locations. This helps a user in identifying additional workflows that the user may be interested in.

In one or more implementations, the ranking is dependent upon whether a feature is mandatory or optional for a given workflow. As such, the system operates to determine whether features are mandatory or optional as part of the analysis. Generally, the increment in the ranking applied for optional features is less than the increment applied for mandatory features. In one example, a weight factor k/2 is used for optional features instead of k (e.g., use half the increment). This adjustment accounts for the fact that optional features of a workflow may be skipped and the operations may still yield good results. The lower increment helps limit false positive situations in which ranks for workflows are increased too much based on optional features that are not actual being used.

A user interface for the application is exposed having elements configured as entry points for the guided workflows, the elements arranged in the user interface in order of the ranks set for the corresponding guided workflows to thereby automatically customize the arrangement of elements based on the relative usage (block 506). Then, responsive to a selection of one of the elements, a corresponding one of the guided workflows is launched (block 508). For example, elements of a user interface 114 may be rearranged to adhere to the order for workflows established through tracking and ranking operations as described in relation to the example of FIG. 3 and elsewhere herein. The rearrangement may involve repositioning of cards, tabs, and/or other guided workflow elements 115 so that elements associated with the most frequently used features are surfaced in locations deemed the most prominent (e.g., top of the list, first in a collection, in order of ranks, etc.). This makes it easier for a user to find and select relevant guided workflows via a customized selection screen. As noted, the guided workflow elements 115 may be configured as entry points that are selectable to launch the corresponding workflows.

As also mentioned, updates 122 for workflows and corresponding guided workflow elements 115 may be distributed by a service provider 106 via a service. For example, new cards, tabs, or other elements may be added to support new workflows. In an implementation, addition and deletion of different guided workflow elements is controlled by the service provider 106. In this approach, the ranks initially associated with elements are also set by the service provider. This enables the service provider to set particular locations for different elements and thereby control how visible cards and other elements are to users. Cards/workflows deemed important can be promoted in prominent locations and on the other hand less important cards/workflows can be "buried" in lower priority locations and tabs. Additionally, rankings set by a service provider 106 may be targeted to and depend upon particular user behaviors, characteristics, and/or geo-locations, as noted previously. Thus, different ranking lists may be generated and used with different groups of individuals to provide an additional level of workflow customization.

The rearrangement techniques discussed already in this document occur automatically and without a user having to do anything particular outside of normal interaction with an application. The application performs the tracking, ranking and rearrangements without requiring explicit user selections to effectuate these operations. It should be noted that the system may also support user driven customizations of the UI arrangements should the user wish to do so. For example, functionality to lock or "pin" one or more guided workflow elements 115 at designated locations may be provided. In this case, the pins override the rankings and any rearrangements will be worked around pinned locations for elements. In another example, the user can initiate rearrangement by dragging and dropping cards at desired locations. The user designated locations will again override the system generated rankings. Thus, the system may obtain input to designate user driven customizations of a collection of elements and in response override the current rankings to enable the user driven customizations.

Figure 6:
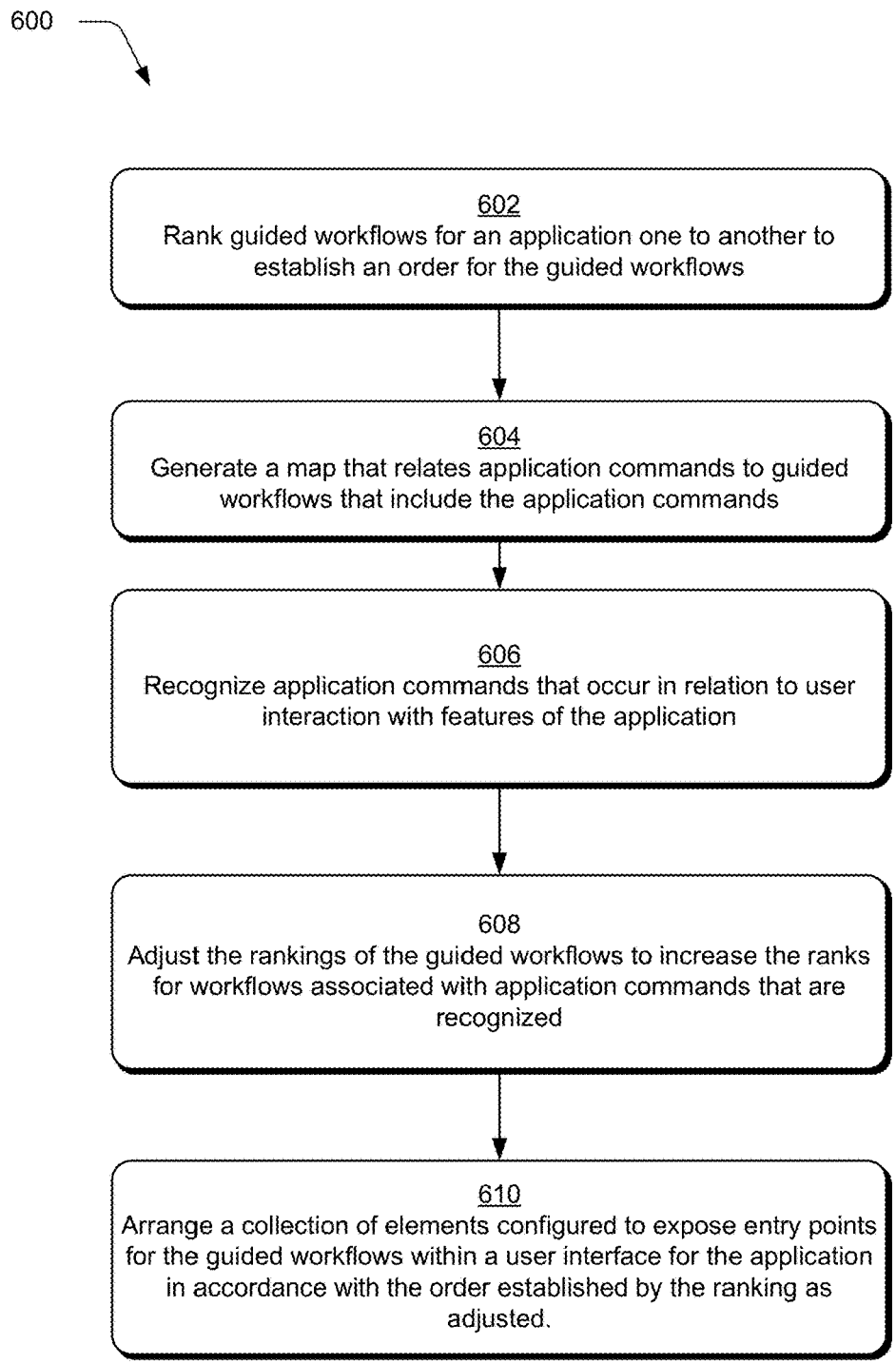
FIG. 6 is a flow diagram depicting another example procedure in accordance with one or more implementations of customized guided workflow element arrangement.

FIG. 6 is a flow diagram depicting another example procedure 600 in accordance with one or more implementations of customized guided workflow element arrangement. In particular, procedure 600 represents an example algorithm to dynamically arrange elements for guided workflow based upon analysis of commands that are executed when a user interacts with application features. Specifically, rankings for workflows as described herein are incremented based in part upon the frequency with which commands associated with the workflows are recognized during user interaction with the application.

Guided workflows for an application are ranked one to another to establish an order for the guided workflows (602). For example, initial rankings may be established by a developer. The initial rankings may be updated thereafter based on feature usage tracking as described herein. Thus, a current ranking for guided workflows may reflect the initial values and any usage based updates that have already occurred.

A map is generated that relates application commands to guided workflows that include the application commands (604) and application commands are recognized that occur in relation to user interaction with features of the application (block 606). For instance, guided workflows each include a number of operations that correspond to executable application commands. The map defines the workflows in terms of corresponding commands that are recognizable by the system and in particular the element manager 116. In this approach, the map is used to correlate application commands that are recognized to corresponding workflows that incorporate those commands. The command map is updated as user interaction occurs to add new commands if appropriate and also to track the frequency of usage.

The rankings of the guided workflows are adjusted to increase the ranks for workflows associated with application commands that are recognized (block 608). For example, upon recognition of an application command in the context of user interaction, the command map is used to identify each workflow that is mapped to the command. The rank for each such workflow is incremented by the designated weight factor. Additionally, the ranking adjustments occur for each different command that is recognized.

Then, a collection of elements configured to expose entry points for the guided workflows are arranged within a user interface for the application in accordance with the order established by the ranking as adjusted (block 610). For example, cards and tabs of a user interface, such as the example user interface 114 discussed previously, may be automatically rearranged one to another based on ranking that is applied to underlying workflows. The cards and tabs (and other elements) are positioned in order of associated ranks which reflect the frequency of usage for commands included in guided workflows underlying the cards and tabs.

Figure 7:
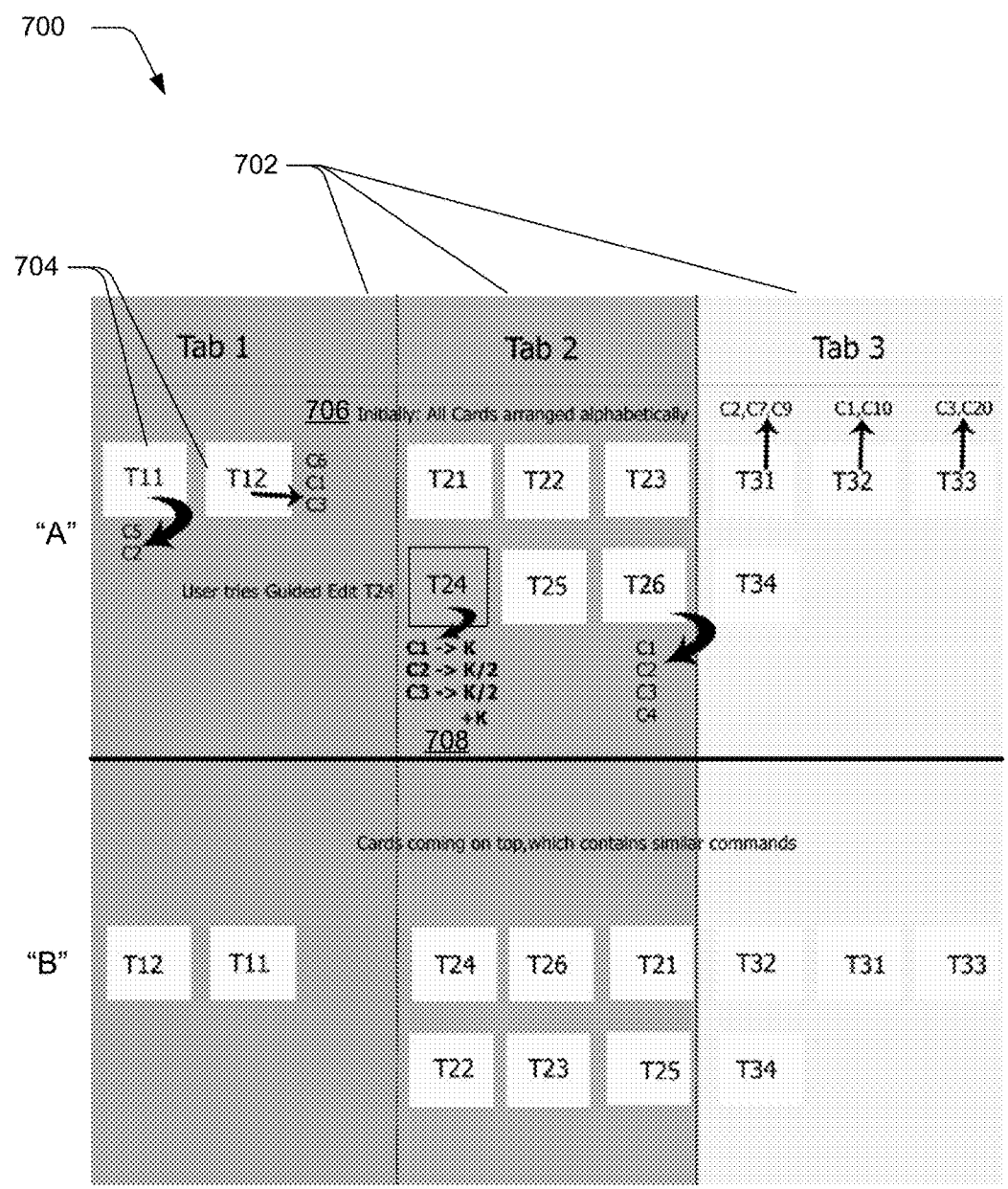
FIG. 7 is a diagram representing an example rearrangement of workflow elements in accordance with one or more implementations of customized guided workflow element arrangement.

To illustrate consider FIG. 7, which depicts generally at 700 a diagram representing an example rearrangement of workflow elements in accordance with one or more implementations of customized guided workflow element arrangement. In particular, FIG. 7 includes views "A" and "B" of an example user interface 114 that includes multiple tabs 702 on which different elements for workflows in the form of cards 704 are arranged. For example, tab 1 includes card T11 and card T12, tab 2 include cards T21 to T26, and tab 3 includes cards T31 to T34. The tabs 702 and cards 704 may correspond to guide workflow elements 115 as discussed previously herein. As indicated at 706, the cards 704 appear in an initial arrangement, which in this example is an alphabetical arrangement.

Each card 704 is associated with application commands for an underlying workflow. For instance, card T11 uses application commands C5 and C2, card T12 uses application commands C6, C1, and C3, and card T24 uses application commands C1, C2, and C3. View "A" represents an initial or current view of the tabs 702 and cards 704 prior to accounting for a particular instance of interaction 708 that triggers changes in the arrangement of elements. In this example, the interaction 708 involves interaction by a user with card T24 to try the underlying workflow.

In accordance with the foregoing discussion of example procedure 600 and details described elsewhere herein, the interaction 708 causes adjusts of the rankings of the guided workflows to increase the ranks for workflows associated with application commands associated with the interaction. In particular, application commands C1, C2, and C3 associated with card T24 are incremented by values k, k/2, and k/2 respectively based on the example interaction 708. Now, rankings of the various guided workflows are updated accordingly to reflect the incremented values of commands C1, C2, and C3. Consequently, any of the cards 704 associated with commands C1, C2, and C3 attain higher ranks and can be rearranged in the UI accordingly.

View "B" represents a rearranged view of the tabs 702 and cards 704 following the interaction 708. In view "B" the cards and workflows have new rankings and are rearranged accordingly. For example, card T12 has taken a first position in tab 1 based on inclusion of command C1 and C3 in the workflow corresponding to card T12. Likewise, card T24 is moved to the first position in Tab 2 and card T26 is now in the second position instead of last based on the commands related to these tabs. Cards include in tab 3 are also rearranged such that card T32 has swapped positioned with card 31 in accordance with the updated rankings. In this way, the cards (as well as tabs and other elements) may be positioned in order of associated ranks which reflect the actual usage of application commands.

Having consider example details of and procedures related to guided workflow element arrangement, consider now a discussion of an example system having various representative components that can be utilized to implement aspects of the techniques described herein.

Example System and Device

Figure 8:
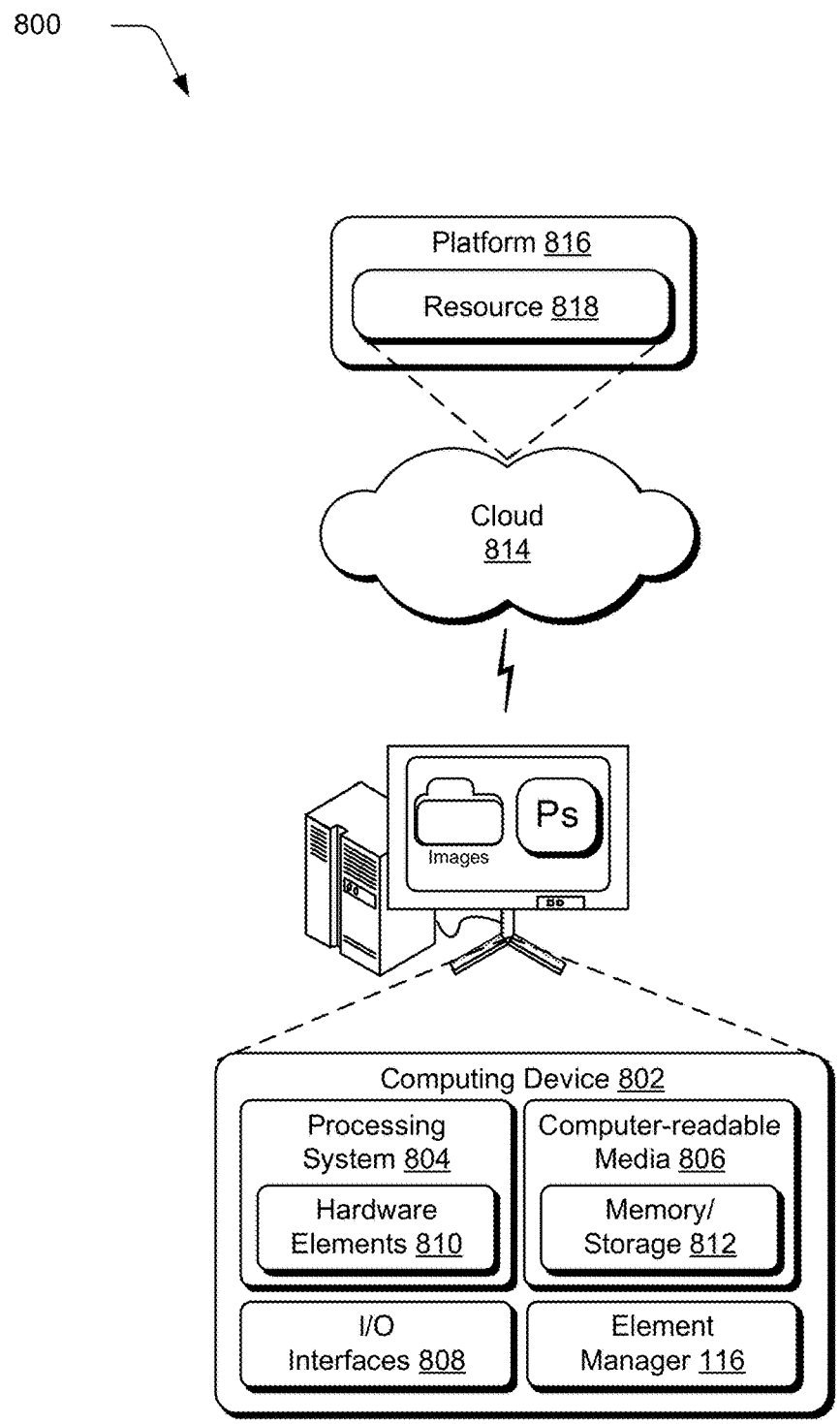
FIG. 8 illustrates an example system including various components of an example device that can be implemented as any type of computing device as described or utilized with reference to FIGS. 1 to 6 to implement aspects of the techniques described herein.

FIG. 8 illustrates an example system generally at 800 that includes an example computing device 802 that is representative of one or more computing systems and devices that may implement the various techniques described herein. This is illustrated through inclusion of the image processing module 112, which may be configured to process image data, such as image data captured by an image capture device 104. The computing device 802 may be, for example, a server of a service provider, a device associated with a client (e.g., a client device), an on-chip system, or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media including by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and functions may be executable/operable by one or more articles of manufacture (for example, one or more computing devices 802 and processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes or is representative of a platform 816 for resources 818. The platform 816 abstracts underlying functionality of hardware (e.g., servers) and software resources of the cloud 814. The resources 818 may include applications or data that can be utilized while computer processing is executed on servers that are remote from the computing device 802. Resources 818 can also include services provided over the Internet or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital content creation environment, a method to customize arrangements of guided workflow elements exposed within a content creation application, the method comprising:
   tracking, by a computing device, user interaction with features available via the content creation application to create or edit digital content;
   determining, by the computing device, amounts of usage of the features, respectively, based on the tracked user interaction;
   ranking, by the computing device, a plurality of guided workflows based on:
      the determined amounts of usage of the features; and
      inclusion of application commands, respectively, by guided workflows of the plurality of guided workflows that correspond to the features;
   exposing, by the computing device, a user interface for the application having the guided workflow elements configured as entry points for the plurality of guided workflows, arrangement of the guided workflow elements is automatically customized in the user interface based on the ranking.

2. A method as described in claim 1, further comprising responsive to a selection of one of the guided workflow elements, launching one of the guided workflows corresponding to the selection.

3. A method as described in claim 1, wherein content creation application comprises an image editing application and the user interface implements multiple tools for managing and editing images.

4. A method as described in claim 1, wherein the guided workflow elements include at least a collection of selectable card components to represent different available features of the content creation application and each selectable to launch a corresponding one of the guided workflows.

5. A method as described in claim 4, wherein the guided workflow elements additionally include multiple tabs of a tabbed user interface, the collection of selectable card components arranged across the multiple tabs.

6. A method as described in claim 1, further comprising causing arrangement of the elements in the user interface in order of the ranks set for the corresponding guided workflows such that elements associated with frequently used features are surfaced in locations deemed prominent.

7. A method as described in claim 1, wherein the ranking includes incrementing ranks for guided workflows that include features identified through the tracking by a weight factor.

8. A method as described in claim 1, wherein the tracking includes monitoring of application features used to interact with, create, and edit content on a per-user basis.

9. A method as described in claim 1, wherein the tracking includes generating and maintaining a feature map to link features to guided workflows that utilize the features, the feature map used to correlate guided workflows to the user interaction.

10. A method as described in claim 9, wherein the tracking further includes storing per-user tracking data and individualized feature maps as user data in association with user accounts.

11. A method as described in claim 1, wherein the guided workflows are designed to give step-by-step instructions and hints to walk users through operations supported by the content creation application.

12. A system comprising:
    a processing system including one or more hardware elements;
    an element manager operable via the processing system to perform operations to customize arrangements of guided workflow elements exposed within a user interface of an application including:
       ranking a plurality of guided workflows for the application, one to another, in an order;
       generating a map that relates application commands of the application to respective guided workflows of the plurality of guided workflows that include the application commands;
       recognizing application commands of respective guided workflows of the plurality of guided workflows that correspond to monitored user interaction with features of the application;
       adjusting the rankings of the plurality of guided workflows based on the recognizing; and
       arranging the guided workflow elements that operate as entry points for respective guided workflows of the plurality of guided workflows, the arranging is automatically customized based on the adjusting.

13. A system as described in claim 12, wherein the element manager is further configured to:
    obtain an update communicated from a service provider over a network, the update specifying rankings for one or more of the guided workflows; and
    apply the update to cause rearrangement of the guided workflow elements in accordance with the rankings specified by the update.

14. A system as described in claim 13, wherein the update defines at least a new guided workflow to add to the plurality of guided workflows available via the application.

15. A system as described in claim 12, wherein the element manager is further configured to obtain input to designate a user driven customization of the guided workflow elements and override the rankings to enable the user driven customization responsive to obtaining the input.

16. One or more computer-readable storage media storing instructions that, responsive to execution by a computing device, are configured to customize arrangements of guided workflow elements exposed within an image editing application including:
    generating a map that relates application commands for the image editing application to guided workflows that include the application commands, the guided workflows having step-by-step instructions for image editing features supported by the image editing application;
    recognizing application commands that involve monitored user interaction with image editing features of the image editing application;
    identifying, based on the map, which of the plurality of guided workflows incorporate the application commands that are recognized;
    incrementing ranks associated with the identified guided workflows by a defined weight factor, one to another; and arranging the guided workflow elements as automatically customized based on the incremented ranks, the guided workflow elements configured to expose entry points for respective guided workflows of the plurality of guided workflows within a user interface for the image editing application.

17. One or more computer-readable storage media as described in claim 16, wherein incrementing ranks includes determining whether the application commands are mandatory or optional and applying an increment for optional features that is less than an increment applied for mandatory features.

18. One or more computer-readable storage media as described in claim 16, wherein the elements include at least:
   a collection of selectable card components to represent different available features of the image editing application and each selectable to launch a corresponding one of the guided workflows; and
   multiple tabs of a tabbed user interface, the collection of selectable card components arranged across the multiple tabs.

19. A method as described in claim 16, wherein recognizing the application commands comprises monitoring usage of image editing features of the image editing application on a per-user basis.

20. One or more computer-readable storage media as described in claim 16, wherein the ranks associated with guided workflows are based upon usage frequency of the image editing features.

* * * * *

UNITED STATES PATENT AND TRADEMARK OFFICE
CERTIFICATE OF CORRECTION

| | |
|---|---|
| PATENT NO. | : 10,126,918 B2 |
| APPLICATION NO. | : 14/926241 |
| DATED | : November 13, 2018 |
| INVENTOR(S) | : Vikas Sharma and Nishant Kumar |

It is certified that error appears in the above-identified patent and that said Letters Patent is hereby corrected as shown below:

In the Claims

Column 16, Line 13, Claim 12 after "to customize", delete "arrangements", insert -- arrangement -- therefor.

Signed and Sealed this
Fifteenth Day of January, 2019

Andrei Iancu
*Director of the United States Patent and Trademark Office*